United States Patent [19]
Suzuki

[11] Patent Number: 5,406,428
[45] Date of Patent: Apr. 11, 1995

[54] APPARATUS AND METHOD FOR RECORDING COMPRESSED DATA WITH RECORDING INTEGRITY CHECK AFTER RECORDING

[75] Inventor: Hiroshi Suzuki, Saitama, Japan
[73] Assignee: Sony Corporation, Japan
[21] Appl. No.: 940,690
[22] Filed: Sep. 3, 1992
[30] Foreign Application Priority Data
    Sep. 3, 1991 [JP] Japan .................. 3-248409
[51] Int. Cl.6 ............................ G11B 5/09; G11B 5/00
[52] U.S. Cl. ................................. 360/53; 360/32; 360/48
[58] Field of Search ............... 360/53, 48, 32, 31, 360/51, 49; 369/54, 58, 83, 84, 124

[56] References Cited
U.S. PATENT DOCUMENTS

| | | | |
|---|---|---|---|
| 3,579,211 | 5/1971 | Larsen | 360/53 |
| 3,774,154 | 11/1973 | Devore et al. | 360/53 |
| 3,805,284 | 4/1974 | Coon, Jr. et al. | 360/53 |
| 4,740,942 | 4/1988 | Ogino et al. | 360/53 |
| 4,873,589 | 10/1989 | Inazawa et al. | 360/32 X |
| 4,882,754 | 11/1989 | Weaver et al. | 360/51 X |
| 5,161,072 | 11/1992 | Ai | 360/53 |
| 5,179,451 | 1/1993 | Takeshita et al. | 360/32 X |
| 5,200,864 | 4/1993 | Dunn et al. | 360/48 |
| 5,257,141 | 10/1993 | Matsumi et al. | 360/32 |
| 5,267,094 | 11/1993 | Aoki | 360/32 |

Primary Examiner—Donald Hajec
Assistant Examiner—Thien M. Le
Attorney, Agent, or Firm—Ian Hardcastle; Limbach & Limbach

[57] ABSTRACT

Compressed digital data obtained by compressing digital input data by, for example, a compression ratio of four, which reduces the amount of data to one fourth of the original amount, is recorded on a magneto-optical disk or other recording medium. The block of compressed data resulting from compressing one block of the input data is recorded on the disc in a time in a fraction (one fourth in the example) of the real time duration of the input data. In the remaining time, the block of recorded data is read out from the disc in the next fraction of the real time duration of the block of input data. The read out block of compressed data is compared with the block of compressed data, and, when the read out block of compressed data does not match the block of compressed data, the same block of compressed data is again recorded in the same place on the disk in the next fraction of the real time duration of the block of input data. This way, it is possible to achieve a recording with high integrity and reliability even under adverse conditions.

34 Claims, 3 Drawing Sheets

APPARATUS AND METHOD FOR RECORDING COMPRESSED DATA WITH RECORDING INTEGRITY CHECK AFTER RECORDING

FIELD OF THE INVENTION

The present invention relates to a compressed data recording method for recording data which has been subjected to a data compression process on to a disk.

BACKGROUND OF THE INVENTION

In the specifications and drawings of Japanese Patent Application No 2-169977, Japanese Patent Application No. 2-221364, Japanese Patent Application No. 2-221365, Japanese Patent Application No. 2-222821, and Japanese Patent Application No. 2-222823, the applicant's assignee has proposed techniques for compressing input digital audio signals and recording predetermined amounts of data as recording units in bursts.

This technology uses a magneto-optical disk as the recording medium and records and reproduces AD (adaptive differential) PCM audio data defined by the so-called CD-I (CD Interactive) or CD-ROM XA audio data format. For example, thirty-two sectors of the ADPCM data together with several additional sectors for accommodating the additional data resulting from interleave processing are used as a recording unit. The recording unit is recorded in a burst on a magneto-optical disk or on other types of recordable disk.

Several modes may be selected for ADPCM audio in a recording and reproducing apparatus using a magneto-optical disk. For example, compared with the data density of the conventional compact disc (CD), level A has a data compression ratio of two, level B has a data compression ratio of four, and level C has a data compression ratio of eight. In level B, the digital audio data is compressed by a factor of four, and the playing time of a disk recorded with level B data compression is four times that of the same capacity disk recorded in the standard CD format (CD-DA format).

Using such data compression, a considerably smaller disk can have about the same recording and playing time as a standard 12 cm CD. The smaller disc enables the equipment to be made smaller in size. Since the track velocity, i.e., the velocity of the recording track relative to the pickup head, of the smaller disk recorded using level B data compression is the same as that of a standard CD, every second, sufficient compressed data is reproduced from the disk to provide four seconds of playback time. As a result, the same compressed data can be repeatedly read out from the disk four times, by the sector, by the cluster, or by some other unit. Only one of the four readings of compressed data is actually decoded and used for the audio reproduction.

The recording signal is recorded on a spiral track on the magneto-optical disk. When the disk is reproduced, the pickup head jumps radially to return to the original track position for four successive revolutions of the disc so that the same portion of the spiral track can be read four times. The audio signal can be successfully reproduced if just one of the four repeated readings can provide compressed data with an acceptable level of integrity for the data decoding circuits. This is advantageous, since it increases the resistance of the apparatus to error playback errors due to physical disturbances. This is especially advantageous in compact portable equipment.

However, the repeated reading operation just described gives no advantage when disk being reproduces includes a recording error.

Simply repeatedly recording the same compressed data during recording provides only the same recording integrity as recording the compressed data once. Thus, effective use of the suitability of the reproduction arrangement to portable compact equipment cannot be made when using the equipment for recording.

OBJECTS AND SUMMARY OF THE INVENTION

The present invention was made in consideration of the above circumstances and has as its object the provision of a method for recording compressed digital data which allows recording with a high degree of reliability and integrity.

In a method according to the invention, a block of input digital data is recorded. The block has a duration of a time unit. A disk including a recording track is provided. The block of input digital data is compressed to provide a block of compressed data, the block of compressed data having a duration of a fraction of a time unit. The block of compressed .data is recorded on a part of the recording track on the disk to provide a recorded block of compressed data. The recorded block of compressed data is read out, after the block of compressed data is recorded on the disc, to provide a read out block of compressed data. The read out block of compressed data is compared with the block of compressed data. Finally, the block of compressed data is rerecorded on the part of the track when the comparison the read out block of compressed data with the block of compressed data indicates that the read out block of compressed data does not match the block of compressed data.

In an apparatus according to the invention for recording a block of input digital data having a duration of a time unit on a disk including a recording track, the apparatus includes a compressing circuit that compresses the block of input digital data to provide a block of compressed data. The block of compressed data has a duration equal to a fraction of a time unit. A recording circuit records the block of compressed data on a part of the recording track on the disk to provide a recorded block of compressed data. A reading circuit reads out the recorded block of compressed data, after the block of compressed data is recorded on the disc, to provide a read out block of compressed data. A comparing circuit compares the read out block of compressed data with the block of compressed data, and provides an error signal when the read out block of compressed data does not match the block of compressed data. The recording circuit additionally rerecords the block of compressed data on the part of the track in response to the error signal. This provides a block of recorded compressed data.

The invention also provides for a disk on which a block of input digital data is recorded on a recording track. The block of digital input data has a duration of a time unit, and is recorded on the disk by a method in which the block of input digital data is compressed to provide a block of compressed data. The block of compressed data has a duration of a fraction of a time unit. The block of compressed data is recorded on a part of the recording track on the disk to provide a recorded block of compressed data. The recorded block of compressed data is read out, after the block of compressed data is recorded on the disc, to provide a read out block of compressed data. The read out block of compressed data is compared with the block of compressed data. Finally, the block of compressed data is rerecorded on the part of the track when the comparison of the read out block of compressed data with the block of compressed data indicates that the read out block of compressed data does not match the block of compressed data.

After the block of compressed data has been rerecorded, the block of rerecorded compressed data on the track is immediately read out, the read out block of rerecorded data and the block of compressed data are once more compared. If the read out block of rerecorded data and the block of compressed data do not match, recording is caused to be stopped.

If the block of compressed data is recorded and reproduced in a time shorter than the duration in real time of the block of the input digital data, as is the case when, for example, the block of input digital data is compressed by a compression ratio of four (in general n), the corresponding block of compressed data can be recorded and reproduced twice (in general n/2 times) during the duration in real time of the block of input digital data. Therefore, the existence of errors in the recorded block of compressed data may be determined immediately after the block of compressed data is recorded on the disk. The determination is made by reading out the recorded block of compressed data from the disk, and comparing the read out block of compressed data with the original block of compressed data. If errors are determined to exist, the same block of compressed data may be rerecorded.

When the block of rerecorded data and the block of compressed data do not match for a second time, it is judged that the disk is defective, i.e., there is a defect in the part of the disk at which the block of compressed data was recorded. In this case, the block of compressed data may be recorded at another location on the disk. When such an event occurs, it is preferable that the user be able to select the number of repetitions of the cycle of recording, reproducing, and comparing the same block of compressed data and the outcome when the predetermined number of repetitions is exceeded (for example, if the recording is to be suspended or if the error is to be ignored and the recording continued). This is because it is desirable that the user be able to select a setting so that the recording continues even though some data is not recorded. This feature is essential in the case of a live recording or a recording of a broadcast where the recording cannot be done again. It is also desirable for the user to be able to select that the recording be automatically stopped when more than a certain number of recording errors is detected. Where the recording signal comes from another recording medium under the user's control, the defective disk can be replaced and the recording done again.

When the block of recorded data does not match the block of original compressed data, the compressed data recorded once again and the possibility of a recording error is reduced by taking full advantage in the recording process of recording using compressed data. This makes it possible to obtain a reliable recording with high integrity even under adverse conditions. It is especially desirable to take advantage of recording with compressed data in portable compact equipment and in-car equipment.

After the block of compressed data is rerecorded, the block of rerecorded data on the track is immediately read out, the read out block of rerecorded data and the block of compressed data are compared, and, if the block of rerecorded data and the block of compressed data do not match, the recording of the compressed data is stopped. This makes it possible to avoid a recording with omissions in the recorded data. Further, if the rerecorded block of compressed data and the block of compressed data do not match, the disk is judged to be defective (have defects in the recorded portion) and the same block of compressed data can be rerecorded in another location of the disk. With this, even if a partially defective disk is used, a recording can be made with fewer omissions than in the past.

DETAILED DESCRIPTION OF THE INVENTION

Figure 1:
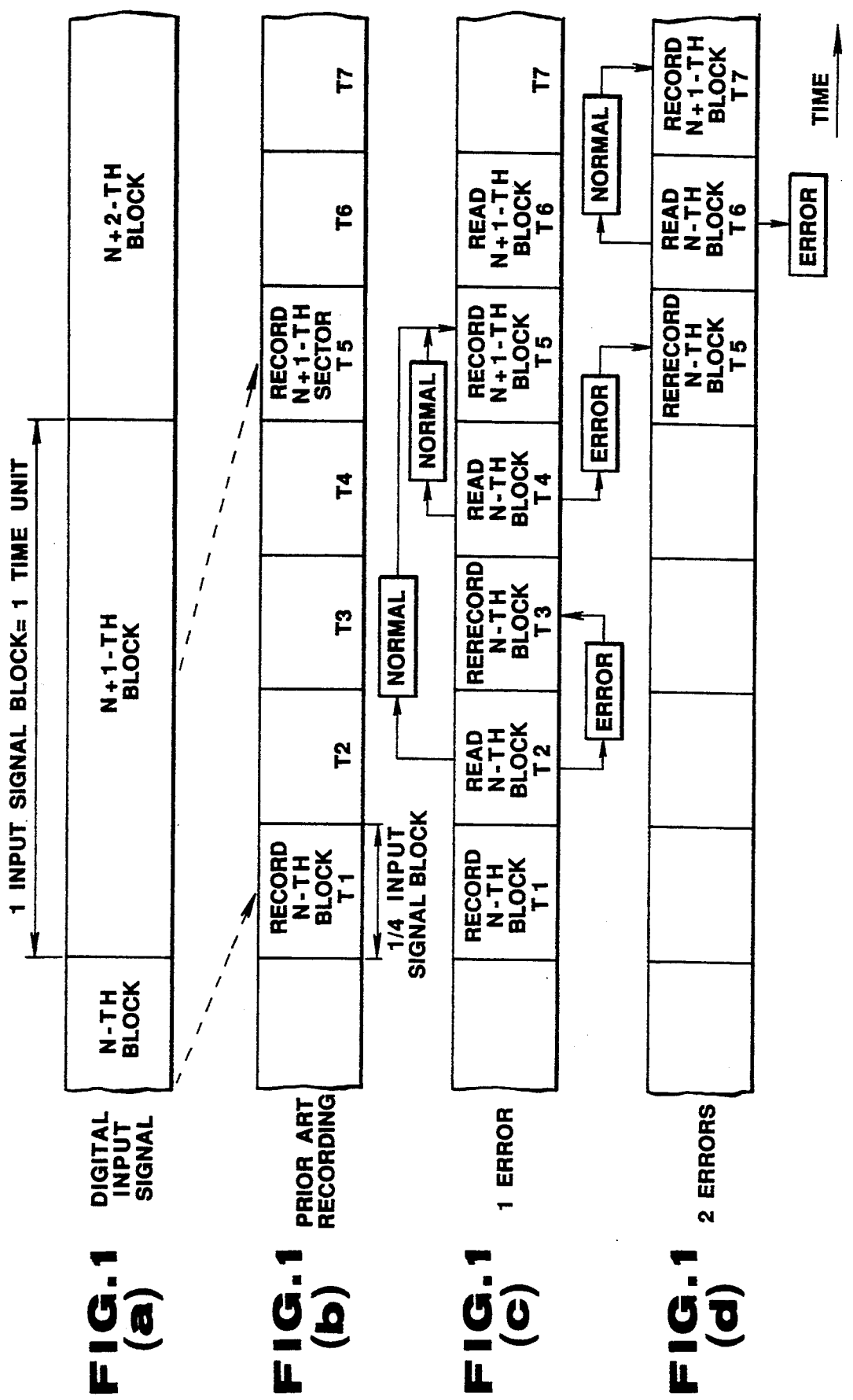
FIG. 1(a) to 1(d) are timing charts for explaining an embodiment of the method for recording compressed digital data according to the present invention.

FIG. 1 shows the process of recording and rerecording over time in a method of recording compressed data with a compression ratio of four (which gives four times the normal playing time) onto a magneto-optical disk etc. in the method of recording compressed digital data according to the present invention. The input data may be compressed according to level B of the CD-I, CD-ROM XA, and other ADPCM audio formats. However, in the present embodiment, the input data is compressed by a factor of four using adaptive transform coding, in which an input signal in the time domain is transformed into a signal in the frequency domain, and the signal in the frequency domain is adaptively coded.

FIG. 1(a) shows a PCM digital input signal representing an analog audio signal, before data compression. The digital input signal is arranged in blocks in the order of the N-th block, N+1-th block, and N+2-th block. A block of the digital input signal is the quantity of the digital input signal that, after data compression, is recorded in one recording unit of the disk. A recording unit of the disk can be a sector or some other subdivision of the disc. The preferred recording unit of the magneto-optical disk is a cluster of 32 sectors. To simplify the following explanation, a time unit will be defined such that one time unit is equal to the duration in real time of one block of the digital input signal.

The block of the digital input signal is compressed, in the preferred embodiment by a factor of four, to provide a block of compressed data. Because of the compression, the block of compressed data contains one fourth of the amount of data of the block of the digital input signal. Because the block of the digital input signal and block of the compressed are transmitted at the same data rate, the duration of the block of compressed data is one fourth of the block of the digital input signal, i.e., one fourth of a time unit.

In the conventional method of recording compressed data derived from the digital input signal with a data compression ratio of four, four track jumps are performed in the course of recording each block onto the disk.

The block of compressed data to be recorded (in this example, the block of compressed data corresponding to the N-th block of the digital input signal) is recorded on the magneto-optical disk delayed relative to the corresponding block of the digital input signal by the processing delay of the adaptive transform coder. The following explanation will assume that the processing delay is equal to the duration in real time of the block of the digital input signal, i.e., one time unit.

In the conventional method of recording, after one time unit has elapsed from the start of the N-th block of the digital input signal, the start of the N-th block of compressed data is recorded on the disk, as shown in FIG. 1(b).

The whole of the compressed data corresponding to the N-th block of the digital input signal is recorded in the time interval T1, which has a duration of one fourth of a time unit, i.e., one fourth of the duration in real time of the block of the input signal. No recording is made in the time intervals T2, T3, and T4, which together have a duration of three fourths of a time unit. The compressed data corresponding to the next block of the input signal, the N+1-th block, is recorded in the time interval T5. The time interval T5 has a duration of one fourth of a time unit and is delayed by one time unit, i.e., by the duration in real time of one block of the input signal, relative to the time interval T1.

In the recording method according to the present invention shown in FIG. 1(c), after a delay of one time unit, the compressed data of the N-th block is recorded during the time interval T1, which has a duration of one fourth of a time unit. The compressed data of the N-th block, just recorded in the time interval T1, is immediately read out during the time interval T2, which has a duration of one fourth of a time unit and immediately follows the time interval T1. The compressed data of the N-th block read out during the time interval T2 is compared with the compressed data of the N-th block. If the read out compressed data of the N-th block and the compressed data of the N-th block match, it is deemed that recording the compressed data of the N-th block was successful, and recording is suspended for two fourths of a time unit, after which, the compressed data of the N+1-th block is recorded during the time interval T5.

If the read out compressed data of the N-th block does not match the compressed data of the N-th block, the compressed data of the N-th block is recorded once again in the time interval T3, which has a duration of one fourth of a time unit, and immediately follows the time interval T2. The rerecorded compressed data of the N-th block is read out once again in the time interval T4, which has a duration of one fourth of a time unit and immediately follows the time interval T3. The compressed data for the N-th block read out during the time interval T4 is compared with the compressed data of the N-th block. If a match is found, it is deemed that the compressed data of the N-th block has been successfully recorded. Recording the compressed data of the N-th block has been completed in the same time, i.e., one time unit, as that required by the conventional recording method. The compressed data corresponding to the next, N+1-th, block of the digital input signal is recorded in the time interval T5, as before.

If the rerecorded compressed data for the N-th block read out in the time interval T4 does not match the compressed data of the N-th block, the compressed data for the N-th block may be recorded once more in the time interval T5, in which the compressed data for the N+1-th block would normally be recorded. The compressed data for the N-th block is recorded for a third time in the time interval T5, and is read and compared with the compressed data for the N-th block in the time interval T6, that has a duration of one fourth of a time unit, and immediately follows the time interval T5, as shown in FIG. 1(d).

Figure 3:
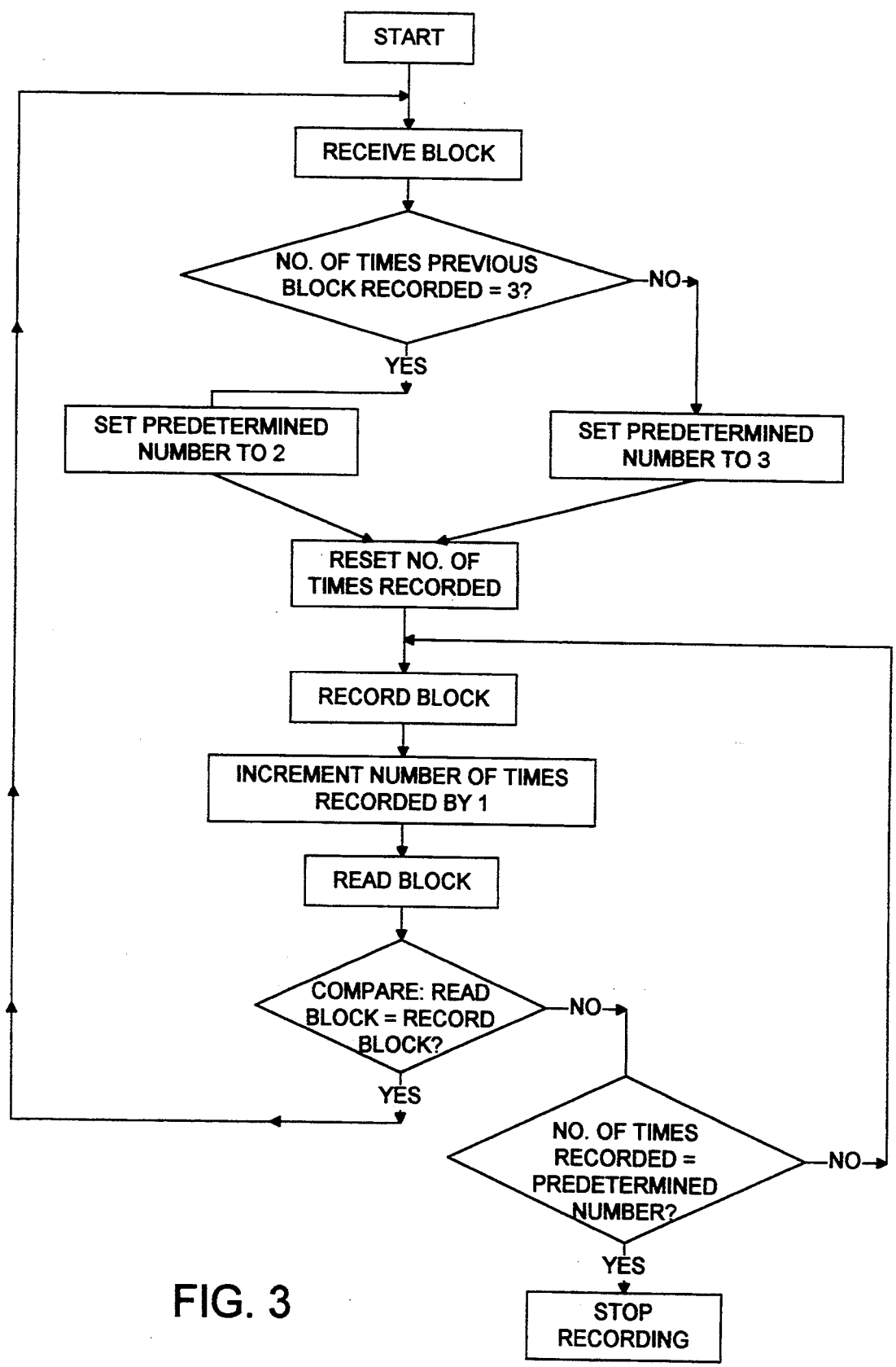
FIG. 3 is a flow chart of an embodiment of the method for recording compressed digital data according to the present invention.

Under the circumstances just described, it is possible to avoid a physical defect in the magneto-optical disk itself by moving the physical track on the magneto-optical disk on which the compressed data for the N-th block is recorded to the part of the track where the compressed data for the N+1-th block would normally be recorded. Whether or not the recording location is moved, if the compressed data for the N-th block is recorded in the time interval T5, the time available for recording the compressed data for the N+1-th block is half that normally available, so only one error in recording the compressed data for the N+1-th block is allowed. Therefore, if the third readout of the compressed data for the N-th block does not match, or the second readout of the compressed data for the N+1-th block does not match, some data will not be recorded. In this case, recording may be stopped, or recording may be continued with the unrecorded data omitted. This decision is preferably left to the user of the equipment. A flow chart showing how the recording method according to the invention determines whether to stop recording after an attempt to record the block is shown in FIG. 3. The number of times a block (e.g., the N+1-th block) can be recorded before recording is stopped is normally three. However, if the previous block (i.e., the N-th block) had to be recorded three times to record it successfully, the number of times that the N+1-th block can be recorded before recording is stopped is reduced to from three to two.

By recording in the way just described, three times as many attempts may be made at recording the compressed data corresponding to a block of the digital input signal compared with conventional recording. Alternatively, if errors occur in recording a number of blocks in succession, twice as many attempts may be made at recording a block compared with conventional recording. Therefore, it is possible to obtain a high integrity recording even under adverse conditions. It is also possible to make full use of the advantages of recording and reproducing compressed data during recording as well as during playback, so this method is suited to recording using portable, compact equipment, and in-car equipment. Further, recording with fewer omissions or errors than in the past is possible even if a partially defective magneto-optical disk is used.

Next, an apparatus for recording on and reproducing from a magneto-optical disk, as a specific example of an apparatus to which the embodiment of the present invention is applied, will be described with reference to FIG. 2.

(a) Opto-Magnetic Recording and Reproducing System

Figure 2:
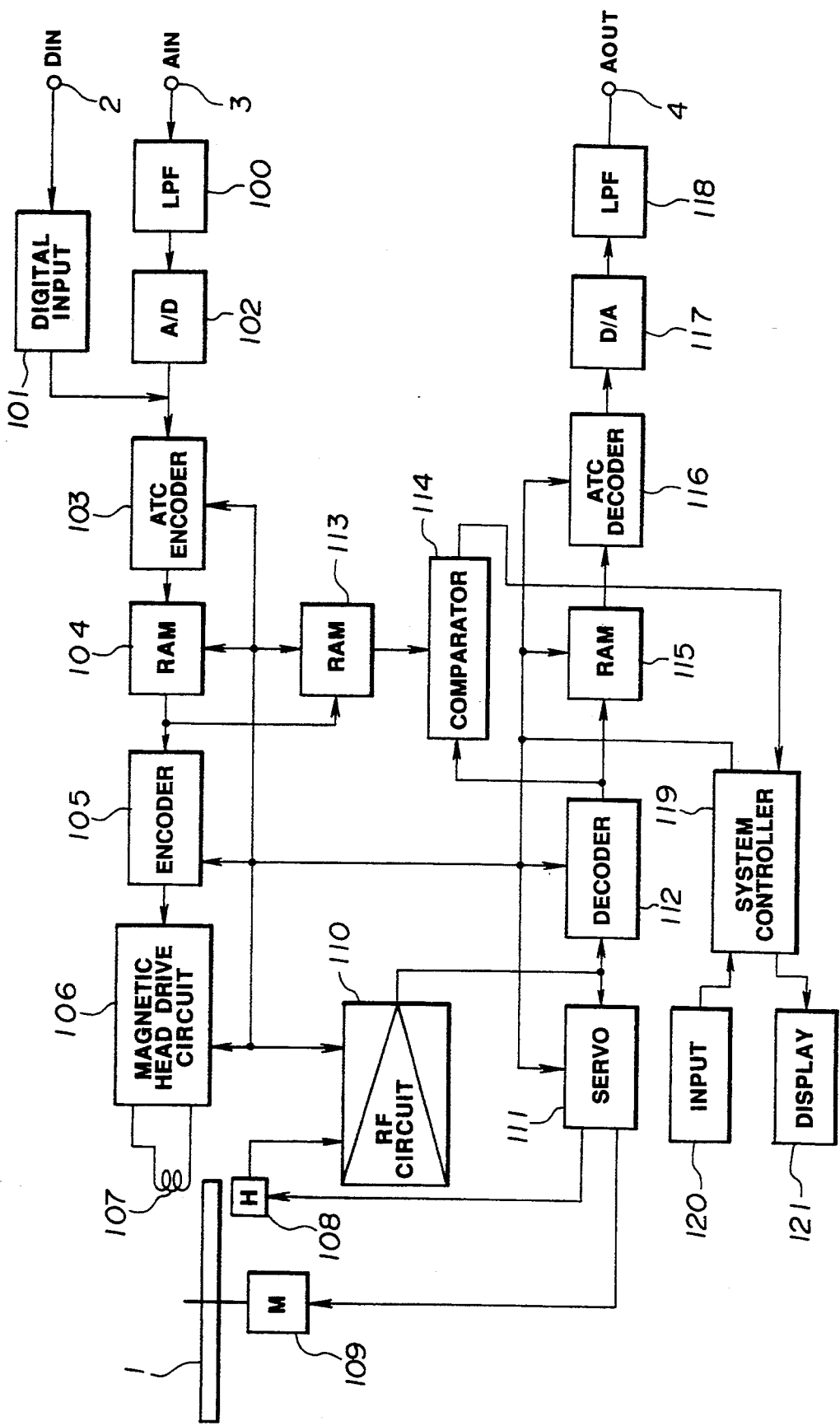
FIG. 2 is a block diagram showing a specific example of an apparatus to which the above embodiment of the present invention is applied.

In the recording and reproducing apparatus shown in FIG. 2, the recording medium is the magneto-optical disc 1, which is rotationally driven by the spindle motor 109.

Data is recorded along a recording track on the magneto-optical disc 1 using magnetic field modulation recording. In this, a magnetic field, modulated in accordance with the recording data, is applied to the magneto-optical disc by the magnetic head 107, driven by the head driver circuit 106, and laser light is radiated onto the disc 1 by the optical head 108. The magnetic head and optical head together provide thermomagnetic recording in accordance with a magnetic field modulation recording.

Data is reproduced from the magneto-optical disc 1 by tracing the recording track using laser light from the optical head 108 to reproduce the recorded data photomagnetically.

The optical head 108 includes a laser light source, such as a laser diode, optical components, such as a collimator lens, object lens, polarization beam splitter, a cylindrical lens, and a photodetector having a predetermined pattern of light receiving units. The optical head 108 is located facing the magnetic head 107 on opposite sides of the magneto-optical disc 1.

The optical head 108 also detects the laser light reflected from the recording track at the point at which the compressed data is recorded or read to enable the optical head to detect focusing errors and tracking errors.

When reproducing compressed data from the magneto-optical disc 1, the optical head 108 detects the above-mentioned focusing errors by the so-called astigmatism method and tracking errors by the so-called push-pull method. The optical head also detects the difference in the polarization angle (Kerr rotation angle) of the laser light reflected from the target track and from this generates a playback signal.

The output of the optical head 108 is fed into the RF circuit 110, which extracts the focusing and tracking signals from the output of the optical head 108 and supplies them to the servo control circuit 111. The RF circuit also converts the output of the optical head into binary signals, which it supplies to the decoder 112, which will be described in detail below.

The servo control circuit 111 consists of, for example, a focusing servo control circuit, a tracking servo control circuit, a spindle motor servo control circuit and a head feed servo control circuit. The focusing servo control circuit controls the optical system of the optical head 108 to reduce the focusing error signal to zero. The tracking servo control circuit also controls the optical system of the optical head to reduce the tracking error signal to zero. The spindle motor servo control circuit controls the spindle motor 109 to rotate the magneto-optical disc 1 to establish a constant linear velocity between the recording track and the optical head. The head feed servo control circuit causes the optical head 108 and the magnetic head 107 to be moved radially to the recording track on the magneto-optical disc designated by the system controller 119.

(b) System Controller

The control key input 120 and the display 121 are connected to the system controller 119. The system controller controls the recording system and the reproducing system according to the operating mode selected by input information entered at the operating key input 120. The system controller 119 also controls the positions of the optical head 108 and the magnetic head 107 on the recording track in both record and playback, in response to sector address information included in the header time and subcode Q data, reproduced from the recording track of the magneto-optical disc 1.

The system controller 119 also causes data compression mode information to be displayed on the display 121 in response to data compression mode information from the adaptive transform coder 103. In record, the data compression mode is selected by the operating key input 120. In playback, data compression mode information comes from the reproduced data generated by the RF circuit 110 and the rest of the reproducing system, as will be described below.

Finally, the system controller 119 displays the playback time on the display 121 in response to the data compression ratio of the designated data compression mode and position information reproduced from the recording track. The sector address information (absolute time information), including header time or subcode Q data, reproduced from the recording track of the magneto-optical disc 1, is multiplied by the data compression ratio of the designated data compression mode to provide the real playback time. For example, if the data compression ratio is four, the absolute time is multiplied by four to provide the real playback time. The time information is displayed on the display 121. During recording, if absolute time information is preformated on the recording track of the magneto-optical disc, this preformated absolute time information may be read and multiplied by the data compression ratio to display the current position by the actual recording time.

During recording, the system controller 119 also monitors the output of the comparator 114, which will be described in detail below, and, when an error is recognized, causes the compressed data to be recorded once more on the magneto-optical disk 1. The system controller causes the compressed data just recorded to be read out once more from the memory 104 to the encoder 105, moves the magnetic head 107 and the optical head 108 to the corresponding tracks, and performs the above-mention rerecording operation.

(c) Recording System

The recording circuit of the recording and reproducing apparatus, the analog audio input signal $A_{IN}$, from the input terminal 3 is supplied, via the low-pass filter 100, to the analog-to-digital converter 102. The analog-to-digital converter converts the analog audio input signal $A_{IN}$ to a PCM digital input signal. The digital input signal is supplied to the adaptive transform coder (ATC) encoder 103. A PCM digital audio input signal $D_{IN}$ from the input terminal 2 is supplied, via the digital input interface circuit 101, to the ATC encoder 103.

The ATC encoder 103 receives the digital input signal at a prescribed data rate and subjects it to data compression according to the one of the various data compression modes of the above-mentioned CD-I system designated by the system controller 119. For example, if the designated data compression mode is the mode in which data is compressed data fed into the memory 104 with a sampling frequency of 44.1 kHz and four bits per sample, the data rate is reduced to one fourth of the data rate of the standard CD-DA format, i.e., from 75 sectors/second to 18.75 sectors/second.

In the apparatus shown in FIG. 2, it is assumed that the sampling frequency of the A/D converter 102 is the same as the sampling frequency of the standard CD-DA format, i.e., 44.1 kHz. It is also assumed that data compression from 16 bits to 4 bits is carried out in the ATC encoder 103 after conversion of the sampling rate to that corresponding to the designated compression mode. Alternatively, the sampling frequency of the A/D converter 102 may be switched as a function of the data compression mode, in which case the cut-off frequency of the low-pass filter 100 should also be switched accordingly. The sampling frequency of the A/D converter 102 and the cut-off frequency of the low-pass filter 100 are preferably simultaneously controlled and switched as a function of the compression mode. If the sampling frequency is not changed with the bit compression mode, a fixed limitation of the frequency band corresponding to the mode with the smallest number of the bits should be used.

Recording data into and reading data from the random access memory (RAM) 104 is controlled by the system controller 119. The ATC data supplied from the ATC encoder 103 is temporarily stored in the memory 104. Also the memory is used as a buffer memory for recording data on the disk. For example, the compressed data supplied from the ATC encoder 103 with a data transfer rate of 18.75 sectors/sec, i.e., ¼ of that (75 sectors/second) of the standard CD-DA format, and is continuously written into the memory 104.

Although it is possible for the compressed digital data from the ATC 103 to be recorded into one of every four sectors, as described above, it is preferred to record the data into sectors continuously, as will be explained below, because recording into one of every four sectors is very difficult. To achieve this, recording is performed in bursts at a data rate of 75 sectors/second, i.e., at the same data rate as that of the standard CD-DA format. Recording is performed in recording units having clusters of a predetermined number of sectors as a recording unit. Preferably each cluster includes 32 sectors, plus several additional sectors to accommodate the additional data resulting from interleaving the recording data in the 32 sectors.

Under control of the system controller 119, the ATC compressed data in the designated data compression mode is written continuously into the memory 104 at the data rate of 18.75 sectors/second of the designated data compression mode. Also under control of the system controller, the compressed data is read out from the memory as recording data in bursts at the data rate of 75 sectors/second. The overall data rate for the compressed data read out from the memory and recorded, inclusive of the non-recording period, is the low rate of 18.75 sectors/second. However, the instantaneous data rate during burst recording is the standard rate of 75 sectors/second. This way, if the recording track to optical head velocity of the magneto-optical disc 1 is the same as the track to optical head recording velocity of the standard CD-DA format, the recording on the magneto-optical disc has the same recording density and the same recording pattern as a CD-DA format recording.

The compressed data read out in bursts from the memory 104 at an instantaneous rate of 75 sectors/second is supplied to the encoder 105 as recording data. In the encoder, the recording data is formed into a continuous recording unit that is made up of a cluster consisting of a plurality of, preferably, 32 sectors, together with several cluster-linking sectors arrayed before and after the cluster. The number of cluster-linking sectors is set so that the cluster-linking sectors can accommodate the additional data that results from interleaving the recording data in the cluster. This way, each cluster and its cluster-linking sectors form a self-contained unit, unaffected by adjoining clusters.

The encoder 105 additionally processes the compressed data read out in bursts from the memory 104 by subjecting it to encoding for error correction, such as parity appending and interleaving, and subjecting it to eight-to-fourteen (EFM) encoding.

The encoded recording data from encoder 105 is fed into the magnetic head driving circuit 106. The magnetic head driving circuit is connected to the magnetic head 107 and causes the magnetic head to apply a magnetic field, modulated in accordance with the encoded recording data, to the magneto-optical disc 1.

The system controller 119 controls the position of the optical head 108 and the magnetic head 107 on the recording track of the magneto-optical disc 1 so that the recording data read out from the memory 104 in bursts is recorded on the recording track of the magneto-optical disc. The system controller also supplies a control signal designating the recording position on the recording track of the magneto-optical disc to the servo control circuit 111.

(d) Reproducing System

The reproducing system of the recording and reproducing apparatus will now be described.

The reproducing system reproduces the data continuously recorded on the recording track of the magneto-optical disc 1 by the above-mentioned recording system, and includes the decoder 112. The optical head 108 illuminates the disc 1 with laser light and generates a playback output signal in response to light reflected from the disc. The playback output signal is fed into the RF circuit 110 where it is converted into a binary playback signal, which is fed into the decoder.

The decoder 112 is the counterpart of the encoder 105 of the recording system described above. The decoder processes the binary playback signal from the RF circuit 110 by applying EFM decoding, error correction, and de-interleaving to provide reproduced compressed data in the above-mentioned designated data compression mode at a data rate of 75 sectors/second. This is faster than the data rate of the designated data compression mode.

Under control of the system controller 119, playback data from the decoder 112 is repetitively written into the memory 115 in bursts at a data rate of 75 sectors/second, and is continuously read out from the memory at the data rate of 18.75 sectors/second, corresponding to the designated data compression mode.

The system controller 119 also controls the position of the optical head 108 on the recording track of the magneto-optical disc 1 to cause the playback data repetitively written in bursts into the memory 115 to be continuously reproduced from the recording track of the disc 1. The system controller supplies a control signal designating the playback position on the recording track of the magneto-optical disc to the servo control circuit 111.

The compressed data in the designated data compression mode, as playback data, is read out continuously from the memory 115 at a data rate of 18.75 sectors/second, and is fed into the ATC decoder 116. The ATC decoder is complementary to the ATC encoder 103 of the recording system. The operating mode of the ATC decoder is designated by the system controller 119. The ATC decoder 116 expands the 4-bit playback data by a factor of four to provide a 16obit digital audio signal. The digital audio signal from ATC decoder 116 is fed into the digital-to-analog converter 117.

The digital-to-analog converter 117 converts the digital audio signal from the ATC decoder 116 into analog signals which pass through the low-pass filter 118 to provide the analog audio output signals $A_{OUT}$ at the output terminal 4.

The memory 113 functions as a delay for obtaining the timing required so that the compressed data recorded on the magneto-optical disk can be compared with compressed data read out from the magneto-optical disk. When the compressed data is recorded at a transfer rate of 75 sectors/second, the time required until the recorded data is once again read out becomes the inverse of that.

(e) Recording Control

The memory 113, under the control of the system controller 119, stores the compressed data to be fed into the encoder 105 in clusters. The system controller reads the stored compressed data out of the memory 113 into the comparator 114 with the same timing as the compressed data that is recorded onto and read out from the magneto-optical disk. In FIG. 2, the memory 113 is shown separately from the memory 104. However, common memory may be used for the memories 104 and 113.

The comparator 114 compares each block of the compressed data received from the memory 113 with each block of the compressed data read out from the disk and received from the decoder 112. The comparator provides the result of the comparison to the system controller 119. The object of the present invention is achieved even if the result of the comparison is merely binary data indicating a match, or non-match. Alternatively, the number of mismatches between the block of compressed data read out from the disk and the block of compressed data can be counted, and different actions can be taken depending on the mismatch count. For instance, if there is no mismatch, the recording is deemed successful. If there is one mismatch, recording will be suspended, and the apparatus will await a command from the user (e.g., stop recording or continue recording). If there are three or more mismatches, recording will be stopped altogether. Different decision thresholds can be set depending on whether the recording being checked is a first recording, (recorded in time interval T1), a first rerecording (recorded in time interval T3) or a second rerecording (recorded in time interval T3). Different decision thresholds can also be set depending on whether or not it is possible to restart the recording, e.g., when a live performance is being recorded.

Note that the present invention is not limited to just the above embodiments. For example, rerecording may be allowed only once per each recording unit. The rerecorded compressed data need not be checked. Recording may be stopped when the rerecorded compressed data is checked and found not to match. Also, rerecording may be allowed to the extent permitted by the buffer memory capacity. A recording method in which recording is stopped when the buffer memory overflows may also be considered. Further, the data compression ratio is not limited to the ratio (4:1) of the above embodiment. Various modifications are of course possible within the scope of the present invention.

I claim:

1. A method for recording an input digital signal in real time, the input digital signal including plural bits having an input bit rate and being divided into blocks, each block having a duration of one time unit, the method comprising the steps of:

providing a disk including a recording track;

rotating the disk continuously in a single direction of rotation;

compressing a block of the input digital signal to provide a block of compressed data, the block of compressed data including plural bits;

recording the block of compressed data on a part of the recording track on the disk to provide a recorded block of compressed data, the block of compressed data being recorded at a bit rate substantially equal to the input bit rate and being recorded for a recording time having a duration of a fraction of a time unit;

reading out the recorded block of compressed data to provide a read out block of compressed data after the block of compressed data is recorded on the disk;

comparing the read out block of compressed data with the block of compressed data; and recording the block of compressed data a second time when the comparing step indicates that the read out block of compressed data does not match the block of compressed data, the steps of recording, reading out, comparing, and recording a second time together being completed within one time unit.

2. The method of claim 1, wherein:

the time unit consists of the fraction of the time unit followed by a reading, comparing, and rerecording time, and the steps of reading out the recorded block of compressed data, comparing the read out block of compressed data with the block of compressed data, and recording the block of compressed data a second time are all performed in the reading, comparing, and rerecording time.

3. The method of claim 2, wherein:

the step of recording the compressed data a second time provides a recorded block of compressed data, and after the step of recording the compressed data a second time the method comprises the additional steps of:

reading out the block of compressed data a second time to provide a second read out block of compressed data;

comparing the second read out block of compressed data with the block of compressed data; and recording the block of compressed data a third time when the comparing step indicates that the second read out block of compressed data does not match the block of compressed data.

4. The method of claim 3, wherein the step of reading out the block of compressed data a second time is also performed in the reading, comparing and rerecording time.

5. The method of claim 3, wherein, in the step of recording the block of compressed data a third time, the block of compressed data is rerecorded on a different part of the track.

6. The method of claim 1, wherein:

in the step of providing a disk including a recording track, the recording track is divided into plural sectors, and in the step of recording the block of compressed data, the block of compressed data is recorded in one sector.

7. The method of claim 1, wherein:
in the step of providing a disk including a recording track, the recording track is divided into plural sectors, and
in the step of recording the block of compressed data, the block of compressed data is recorded in a cluster comprising a plurality of sectors.

8. The method of claim 1, wherein, in the step of compressing a block of the input digital signal to provide a block of compressed data:
the input digital signal is a 16-bit digital signal resulting from sampling an analog input signal at 44.1 kHz, and
the compressed data is 4-bit data.

9. A method for recording an input digital signal in real time, the input digital signal including plural bits having an input bit rate and being divided into blocks, each block having a duration of one time unit, the method comprising the steps of:
providing a disk including a recording track;
compressing a block of the input digital signal to provide a block of compressed data;
performing a cycle including the steps of:
recording the block of compressed data on a part of the recording track on the disk to provide a recorded block of compressed data, the block of compressed data being recorded at a bit rate substantially equal to the input bit rate,
reading out the recorded block of compressed data to provide a read out block of compressed data after the block of compressed data is recorded on the disk, and
comparing the read out block of compressed data with the block of compressed data
the cycle being performed at least once until the comparing step indicates that the read out block of compressed data matches the block of compressed data; and
causing performance of the cycle to stop when the read out block of compressed data and the block of compressed data do not match after the cycle has been performed a predetermined number of times.

10. The method of claim 9, wherein:
in the step of compressing the block of the input digital signal to provide the block of compressed data, the block of the input digital signal is compressed with a compression ratio, and
in the step of causing performance of the cycle to stop, the predetermined number of times depends on the compression ratio.

11. The method of claim 10, wherein:
in the step of compressing the block of the input digital signal to provide a block of compressed data, the block of the input digital signal is compressed with a compression ratio of four, and
in the step of recording the block of compressed data, the block of compressed data is recorded for a recording time having a duration of a fraction of a time unit, the fraction being one fourth.

12. The method of claim 11, wherein, in the step of causing performance of the cycle to stop, the predetermined number of times is three.

13. The method of claim 11, wherein, in the step of causing performance of the cycle to stop, the predetermined number of times is two for an N+1-th block immediately following an N-th block, when the read out block of compressed data for the N-th block matches the block of compressed data for the N-th block only after a third recording of the block of compressed data for the N-th block.

14. The method of claim 9, wherein:
in the step of providing a disc including a recording track, the recording track is divided into sectors, and
in the step of recording the block of compressed data, the block of compressed data is recorded in one sector.

15. The method of claim 9, wherein:
in the step of providing a disc including a recording track, the recording track is divided into sectors, and
in the step of recording the block of compressed data, the block of compressed data is recorded in a cluster comprising a plurality of sectors.

16. The method of claim 9, wherein, in the step of compressing a block of the input digital signal to provide a block of compressed data:
the input digital signal is a 16-bit digital signal resulting from sampling an analog input signal at 44.1 kHz, and
the compressed data is 4-bit data.

17. The method of claim 9, wherein, in the step of recording the block of compressed data, the block of compressed data is recorded on a different part of the track when the cycle is performed a third time.

18. An apparatus for recording a block of an input digital signal in real time on a disk including a recording track, the input digital signal including plural bits having an input bit rate and being divided into blocks, each block having a duration of one time unit, the apparatus comprising:
means for rotating the disk continuously in a single direction of rotation;
compressing means for compressing a block of the input digital signal to provide a block of compressed data, the block of compressed data including plural bits;
recording means for recording the block of compressed data on a pan of the recording track on the disk to provide a recorded block of compressed data the recording means recording the block of compressed data at a bit rate substantially equal to the input bit rate for a recording time having a duration of a fraction of one time unit;
reading means for reading out the recorded block of compressed data to provide a read out block of compressed data after the block of compressed data is recorded on the disk; and
comparing means for comparing the read out block of compressed data with the block of compressed data, and for providing an error signal when the read out block of compressed data does not match the block of compressed data; and wherein:
the recording means is additionally for recording, in response to the error signal, the block of compressed data for a second time to provide a block of recorded compressed data, and
the recording means records the block of compressed data, the reading means reads out the read out block of compressed data, the comparing means compares the read out block of compressed data with the block of compressed data, and provides an error signal, and the recording means records the block of compressed data for a second time all within one time unit.

19. The apparatus of claim 18, wherein:
the time unit consists of the fraction of the time unit followed by a reading, comparing, and rerecording time, and
in the reading, comparing, and rerecording time,
the reading means reads out the recorded block of data,
the comparing means compares the read out block of compressed data with the block of compressed data and provides the error signal when the read out block of compressed data does not match the block of compressed data, and
the recording means records, in response to the error signal, the block of compressed data for a second time to provide a block of recorded compressed data.

20. The apparatus of claim 19, wherein:
the recording means records, in response to the error signal, the block of compressed data a second time to provide a block of recorded compressed data,
the reading means is additionally for reading out the recorded block of compressed data a second time to provide a second read out block of compressed data,
the comparing means is additionally for comparing the second read out block of compressed data with the block of compressed data and for producing an error signal when the second read out block of compressed data does not match the block of compressed data, and
the recording means is additionally for recording a third time, in response to the error signal, the block of compressed data.

21. The apparatus of claim 20, wherein, also in the reading, comparing, and rerecording time, the reading means reads out the recorded block of compressed data a second time to provide the second read out block of compressed data.

22. The apparatus of claim 20, wherein the recording means is additionally for recording the block of compressed data a third time on a different part of the track.

23. The apparatus of claim 18, wherein:
the recording track is divided into plural sectors, and
the recording means records the block of compressed data in one sector.

24. The apparatus of claim 18, wherein:
the recording track is divided into plural sectors, and
the recording means records the block of compressed data in a cluster comprising a plurality of sectors.

25. The apparatus of claim 18, wherein the compressing means compresses a block of the input digital signal to provide a block of compressed data, wherein:
the input digital signal is a 16-bit digital signal resulting from sampling an input signal at 44.1 kHz, and
the compressed data is 4-bit data.

26. An apparatus for recording in real time an input digital signal on a disk including a recording track, the input digital signal including plural bits having an input bit rate and being divided into blocks, each block of the input digital signal having a duration of one time unit, the apparatus comprising:
compressing means for compressing a block of the input digital signal to provide a block of compressed data;
recording means for recording the block of compressed data on a part of the recording track on the disk to provide a recorded block of compressed data the recording means recording the block of compressed data at a bit rate substantially equal to the input bit rate;
reading means for reading out the recorded block of compressed data to provide a read out block of compressed data after the block of compressed data is recorded on the disk;
comparing means for comparing the read out block of compressed data with the block of compressed data, and for providing an error signal when the read out block of compressed data does not match the block of compressed data;
control means, operating in response to the error signal, for controlling the recording means and the reading means to operate in a repetitive cycle until the error signal indicates that the read out block of compressed data matches the block of compressed data; and
recording stop means for causing the recording means to stop recording when the error signal indicates that the block of read out compressed data does not match the block of compressed data after the recording means has recorded the block of compressed data a predetermined number of times.

27. The apparatus of claim 26, wherein:
the compressing means compresses the block of the input digital signal with a compression ratio, and
the recording stop means causes the recording means to stop recording when the error signal indicates that the block of read out compressed data does not match the block of compressed data after the recording means has recorded the block of compressed data a predetermined number of times, the predetermined number of times depending on the compression ratio.

28. The apparatus of claim 27, wherein:
the compressing means compresses the block of the input digital signal with a compression ratio of four, and
the recording means records the block of compressed data for a recording time having a duration of a fraction of a time unit, the fraction being one fourth.

29. The apparatus of claim 28, wherein the recording stop means causes the recording means to stop recording when the error signal indicates that the block of read out compressed data does not match the block of compressed data after the recording means has recorded the block of compressed data three times.

30. The apparatus of claim 28, wherein the recording stop means causes the recording means to stop recording when the error signal indicates that the read out block of compressed data for an N+1-th block does not match the block of compressed data for the N+1-th block after the block of compressed data for the N+1-th block has been recorded twice when the N+1-th block immediately follows an N-th block wherein the error signal indicates that the read out block of compressed data for the N-th block matches the block of compressed data for the N-th block only after the recording means has recorded the compressed data for the N-th block a third time.

31. The apparatus of claim 26, wherein:
the recording track is divided into plural sectors, and
the recording means records the block of compressed data in one sector.

32. The apparatus of claim 26, wherein:

the recording is divided into plural sectors, and the recording means records the block of compressed data in a cluster comprising a plurality of sectors.

33. The apparatus of claim 26, wherein:
the input digital signal is a 16-bit digital signal resulting from sampling an input signal at 44.1 kHz, and the compressed data is 4-bit data.

34. The apparatus of claim 29, wherein the control means causes the recording means to record the block of compressed data on a different part of the track.

* * * * *